(12) United States Patent
Goyne et al.

(10) Patent No.: US 6,532,728 B1
(45) Date of Patent: Mar. 18, 2003

(54) REDUCING SKIN FRICTION DRAG

(75) Inventors: Christopher Paul Goyne, Charlottesville, VA (US); Raymond John Stalker, Kenmore (AU); Allan Paull, Cedar Creek (AU)

(73) Assignee: University of Queensland (AU)

( * ) Notice: Subject to any disclaimer, the term of this patent is extended or adjusted under 35 U.S.C. 154(b) by 0 days.

(21) Appl. No.: 09/693,586

(22) Filed: Oct. 20, 2000

(30) Foreign Application Priority Data

Oct. 22, 1999 (AU) .............................................. PQ3612

(51) Int. Cl.[7] .......................... B63H 11/00; B64G 9/00; F02K 9/00; F03H 9/00; F23R 9/00
(52) U.S. Cl. .......................................... 60/204; 60/743
(58) Field of Search .................... 60/204, 776, 768, 60/767, 265, 743

(56) References Cited

U.S. PATENT DOCUMENTS 5,058,826 A * 10/1991 Coffinberry ............... 244/53 R
5,255,513 A * 10/1993 Kutschenreuter, Jr. et al. ............................ 60/204

OTHER PUBLICATIONS

Haimovitch, Yaacov et al. "Effects of Internal Nozzle geometry on Compression–Ramp Mixing in Supersonic Flow." AIAA Journ vol. 35 (Apr. 1997): 663–670.*
Da Silva, Luis et al. "Ignition and Spread of Combustion within a Supersonic Boundary Layer" Internationale Jahrestagung Journal (1991):21–1 to 21–13.*
Da Silva, Luis et al. "A Numerical Study of hydrogen–air Combustion within a Supersonic Boundary Layer" AIAA Journal vol. 31 (Jan. 1992):1–9.*
Sunami, Tetsuji et al. "On the Combustion and Unstart Processes of a Scramjet Engine Model" Japanese Science and Tech. Corp. vol. 44 (1999): 65–70.*
"Skin Friction Measurements in the T4 Shock Tunnel", pp. 1125–1130, C.P. Goyne, R.J. Stalker and A. Paull, the 21st International Symposium on Shock Waves held Jul. 20–25, 1997 Great Keppel, Australia.
"The Turbulent Boundary Layer on Chemically Active Ablating Surfaces", M. Richard Denison, Journal of the Aerospace Sciences (Jun. 1961).
"Transport Proceses in a Combustible Turbulent Boundary Layer", Norman G. Kulgein, Journal of Fluid Mechanics, vol. 12, pp. 417–437 (1962).

* cited by examiner

Primary Examiner—Charles G. Freay
Assistant Examiner—W Rodriguez
(74) Attorney, Agent, or Firm—Timothy J. Martin; Michael R. Henson; Rebecca A. Gegick

(57) ABSTRACT

The skin friction drag acting on a surface of an article travelling at high speed such as a vehicle at supersonic or particularly hypersonic speed can be reduced by introducing a fuel into the boundary layer under conditions of the fuel introduction to ensure combustion in the boundary layer. The fuel is injected through orifice(s) or a slot provided at the surface so that the fuel enters the passing fluid with a major component of the direction of injection being parallel to the local flow direction. The fuel is injected at supersonic speed, e.g. at a speed of about Mach 1.5 or higher. The invention is applicable to scramjet engines with the fuel being injected around the entire internal circumference of the wall of the scramjet engine, upstream of the commencement of the combustion chamber.

34 Claims, 2 Drawing Sheets

REDUCING SKIN FRICTION DRAG

FIELD OF THE INVENTION

This invention relates to methods and apparatus for reducing skin friction drag and to systems utilising such methods and apparatus, particularly in the field of reducing the drag force on high velocity vehicles passing through the atmosphere.

BACKGROUND OF THE INVENTION

The invention is particularly suitable for, but not limited to, the reduction of drag in vehicles travelling at high speeds through the atmosphere. Of particular interest are vehicles travelling at hypersonic speeds, i.e. travelling at speeds of about or greater than five times the speed of sound in the atmosphere. However, vehicle travelling at near hypersonic speeds (e.g. between Mach 4 and 5) and at supersonic speeds are also of interest and the invention relates also to such vehicles. When used in this specification, the term "vehicle" is intended to include for example aircraft, space planes, missiles, projectiles and other such flying objects.

Presently used propulsion systems for launching satellites into earth orbit use rocket propulsion systems in which the fuel and oxidiser are carried by the vehicle. There have been proposals and experiments to develop vehicles for atmospheric travel, including satellite launching, using hypersonic air breathing propulsion systems. These propulsion systems extract the required oxygen for combustion from the atmosphere instead of the vehicle carrying the oxidiser. One of these alternative propulsion systems is known as a supersonic combustion ramjet or "scramjet". This proposed system creates the thrust through heat release by combustion in supersonic flows.

There are two major contributions to drag of vehicles in flight, namely a drag due to the pressure force acting on the surface of the vehicle and skin friction which is the shear force acting tangentially upon the surface of the vehicle due to the passage of air over the surface. Skin friction becomes an increasingly significant part of the drag as the speed of the vehicle increases and, at hypersonic speeds, skin friction can become the dominant component of the drag. The skin friction drag includes not only such drag generated on the outside surfaces of the vehicle but also drag on the inside surfaces of the engine, e.g. in the combustion chamber of a scramjet. The drag in the combustion chamber can contribute in the order of 30% of the overall drag.

It is known that the skin friction drag is due to the viscosity of air, which causes retardation of that part of the air stream passing around the vehicle and which is adjacent to the surface of the vehicle including both external surfaces of the vehicle and internal surfaces within the scramjet, particularly in the combustion chamber. The part of the air stream which is retarded by viscous effects is referred to as the "boundary layer". It has been proposed in the past to cool the combustion chamber walls and to reduce skin friction by introducing a flow of a gas, such as chemically inert helium, into the boundary layer, which is a technique known as "film cooling".

However after several decades of theoretical and experimental work, the practical feasibility of scramjet propulsion systems for vehicles travelling at hypersonic speeds is still significantly constrained by limitations caused by skin friction drag.

OBJECTS OF THE INVENTION

It is an object of the present invention to provide a method and apparatus for reducing the skin friction drag in an object travelling at high speed relative to a passing fluid.

It is a further object to provide operational objects or systems such as propulsion systems or high speed vehicles, utilising the methods and apparatus of the present invention to reduce skin friction drag.

SUMMARY OF THE INVENTION

According to the present invention there is provided a method of reducing the skin friction drag acting on a surface of an article travelling at high speed relative to a passing fluid, the method including the steps of introducing a fuel into the boundary layer of the fluid relatively passing along the surface of the article at high speed, and providing conditions of the fuel introduction to ensure that the introduced fuel undergoes combustion in the boundary layer and while relatively passing the surface of the article downstream of the introduction thereof.

The introduction of fuel in a manner to undergo combustion in the boundary layer has been surprisingly found to reduce skin friction by an extent substantially greater than predicted from inert gas film cooling predictions or analyses.

The fuel may be a gas, vapour, liquid or particulate aerosol or solid, or a mixture thereof.

Preferably the fuel is introduced into the boundary layer in a manner which ensures that a significant quantity will remain in the boundary layer sufficient to support vigorous combustion therein.

It is believed that it is preferable to ensure the fuel remains in and combustion occurs in the boundary layer. The fuel may be injected substantially parallel to the local flow direction of the fluid relatively passing the article. For example, the fuel may be injected through a slot or through orifices provided in the surface of the article past which the fluid is relatively passing, the slot or orifices being arranged so that the fuel enters the passing fluid with a major component (and most preferably substantially the entire component) of direction of injection being parallel to the local flow direction.

As an alternative to injection of fuel parallel to the local flow directions injection of fuel through a slot or orifices at the surface of the article may be at an angle to the local flow direction so that the fuel is compelled by aerodynamic effects to substantially flow within the boundary layer downstream of the injection zone.

Whether the direction of injection is substantially parallel to the local flow direction or is at an angle to that direction but aerodynamic effects cause the fuel to flow within the boundary layer, the slots or orifices are preferably arranged to inject the fuel at high speed and preferably at supersonic speed (although this injection speed may be substantially less than the relative speed of the passing fluid which be at hypersonic speed). A slot or a number of slots or orifices may be provided in the surface of the article, e.g. in a step or shoulder facing downstream so that the fuel is injected in the desired direction. In the case of a scramjet engine, the fuel may be injected around substantially the entire internal circumference of the outside wall of the scramjet engine, e.g. upstream of the commencement of the combustion chamber and possibly also downstream of the combustion chamber. For example, a continuous substantially annular slot may be provided around the entire internal circumference of the outside wall of the scramjet engine.

As an alternative to injection of fuel through a slot or orifices, there may be provided a porous surface on the article through which the fuel is injected under pressure into the passing fluid whereby the fuel travels along the boundary layer and combustion occurs therein.

As a further alternative possibility, fuel may be introduced into the boundary layer by ablation from the surface along which the fluid is travelling.

There may also be other suitable means for introducing fuel, including use of the methods mentioned above in various combinations.

To ensure that the fuel introduced into the passing fluid undergoes combustion in the boundary layer, the method of the present invention may include controlling thermodynamic parameters of the fuel and/or passing fluid to ensure combustion occurs. In particular, the temperatures and pressures of the fuel and of the passing fluid may affect whether the conditions exist to ensure combustion within the boundary layer. The temperatures and pressures will depend upon the fuel being used. The specific example described later will exemplify such thermodynamic parameters.

Another possibility to ensure combustion in the method and apparatus of the present invention is to introduce fuel additives which will extend the range of temperatures and/or pressures at which combustion will occur within the boundary layer, e.g. by lowering the ignition temperature or increasing the exothermic heat yield of the combustion that does occur. A yet further possibility of ensuring or optimising combustion within the boundary layer is to seed the passing fluid and/or the introduced fuel with, for example, chemically active free radicals which will extend the range of temperatures and pressures at which combustion will occur within the boundary layer.

Although the present invention has been broadly outlined above in relation to a method for reducing skin friction drag, the invention also provides apparatus which includes means for carrying out the steps of the inventive method.

According to the present invention there is provided apparatus for reducing the skin friction drag acting on a surface of an article travelling at high speed relative to a passing fluid, the apparatus including means for introducing a fuel into the boundary layer of the fluid relatively passing along the surface of the article at high speed, and means for providing conditions of the fuel introduction to ensure that the introduced fuel undergoes combustion in the boundary layer and while relatively passing the surface of the article downstream of the introduction thereof.

The means for introducing the fuel into the boundary layer is preferably operative to ensure that most of the fuel remains in the boundary layer and to ensure that combustion of the fuel occurs in the boundary layer. The means for introducing the fuel into the boundary layer may comprise means for injecting the fuel substantially parallel to the direction of flow of the fluid relatively passing the article. The means for introducing the fuel into the boundary layer may comprise at least one orifice provided at the surface of the article past which the fluid relatively passes, the orifice(s) being arranged so that the fuel enters the relatively passing fluid with a major component of the direction of injection being parallel to the local flow direction at the orifice(s).

The present invention also provides operational objects or systems utilising the method and apparatus of the present invention, such as scramjet engines embodying the apparatus of the invention and vehicles incorporating such scramjet engines.

Therefore according to a further aspect of the invention there is provided a scramjet engine having an intake for air, a passage through which the air flows at high speed, the passage having a surrounding wall defining the outside surfaces of the passage, a combustion chamber, and an exhaust for discharge of air and combustion products, the scramjet including means for introducing a fuel into the boundary layer of the air passing along the wall at high speed, the fuel being injected around substantially the entire internal circumference of the wall of the scramjet engine, the scramjet engine further including means for providing conditions of the fuel introduction to ensure that the introduced fuel undergoes combustion in the boundary layer while passing along the wall downstream of the introduction thereof.

The means for introducing the fuel in the scramjet engine preferably injects the fuel substantially upstream of the commencement of the combustion chamber of the scramjet engine. It may be also advantageous to inject fuel along the wall downstream of the combustion chamber.

The means for introducing the fuel may comprise a substantially continuous annular slot provided around the entire internal circumference of the wall. The annular slot may be located in a step facing downstream relative to the passing air so that the fuel is injected in a direction along the wall to ensure the fuel remains in the boundary layer downstream of the step and combustion occurs in the boundary layer downstream of the step.

The present invention also provides a high speed vehicle for travelling through the atmosphere at supersonic or hypersonic speed, the vehicle having a propulsion system including a scramjet engine according to the invention.

It will be convenient to further describe the invention in connection with a particular apparatus developed for experimentally verifying and developing the invention.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings.

DETAILS DESCRIPTION OF EMBODIMENTS

Figure 1:
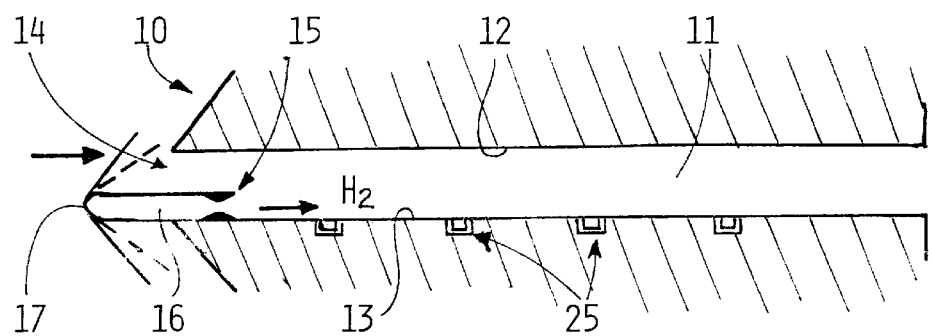
FIG. 1 is a schematic side sectional view of experimental apparatus according to the present invention.
Figure 2:
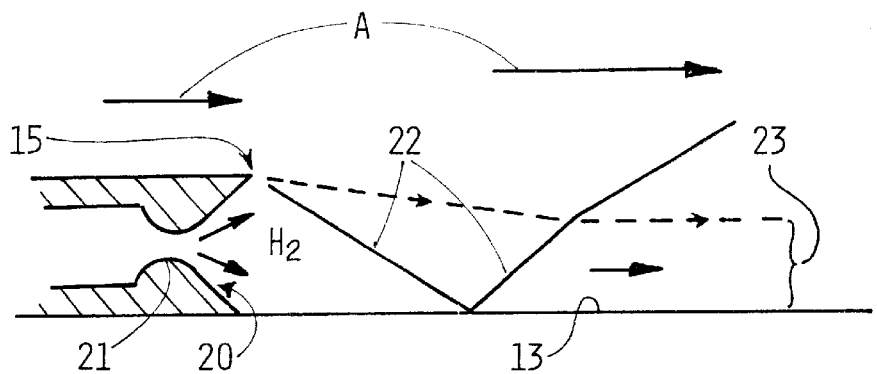
FIG. 2 is a detailed side sectional view of the fuel injection zone in FIG. 1, FIG. 3 provides graphical experimental results of skin friction tests.

Referring to FIGS. 1 and 2, tests were carried out in a shock tunnel apparatus 10 having an experimental duct 11 having parallel planar upper and lower faces 12, 13. A high speed air flow was introduced into the mouth 14 of the duct 11, the mainstream flow A through the duct 11 being at Mach 4.5, a stagnation enthalpy of 7.8 MJ/kg, a pressure of 50 kPa and a temperature of 1500° K, (this is a combination of flow variables including thermodynamic parameters sufficient to ensure combustion in the boundary layer along duct face 13 as discussed below).

Hydrogen was injected through a rearward facing step 15 formed at the trailing face of an injection strut 16 located on the duct face 13. The leading edge 17 of the strut 16 was located sufficiently far upstream of the mouth 14 to ensure that the shock and succeeding Prandtl-Meyer expansion did not pass into the duct 11.

As better shown in FIG. 2, the step 15 provides a nozzle 20 which forms a slot extending across and parallel to the duct face 13 and through which hydrogen was injected at supersonic speeds. The linear shape of the injection nozzle 20 yields a substantially two-dimensional flow. Hydrogen was supplied from a room temperature reservoir through a solenoid operated valve actuated shortly before the arrival of the test flow.

Tests were conducted at different values of hydrogen mass flow. The hydrogen undergoes a supersonic expansion after passing the throat 21 of the injection nozzle 20 and a subsequent recompression to the static pressure in the mainstream A within a few step heights downstream of the step 15. For higher mass flows, the hydrogen supply pressure can be high enough to produce full expansion through the nozzle to the height of the step 15. A recompression then is believed or postulated to consist two oblique shocks 22 as shown in FIG. 2. By assuming such a flow, an inviscid density, velocity, Mach number and thickness the hydrogen film at the mean mainstream pressure was calculated. Two tested mass flows are as follows:

TABLE 1

| Measured | Injected hydrogen parameters | | | |
|---|---|---|---|---|
| | Calculated inviscid film properties | | | |
| Mass Flow kg/s | Density Kg/m$^3$ | Velocity m/s | Mach No. | Film thickness mm |
| 0.029 | 0.062 | 1550 | 1.5 | 3 |
| 0.043 | 0.074 | 1770 | 1.8 | 3.3 |

As shown schematically in FIG. 1, the duct face 13 was provided with instruments to measure skin friction, heat transfer and pressure. The skin friction gauges 25 were of the floating element type, with the shear force transferred directly to shear on a piezo electric element. The design and use of these gauges can be obtained from the paper: Goyne, C. P., Paull, A. and Stalker R. J. "Skin friction measurements in the T4 shock tunnel". Proceedings of 21st International Symposium on Shock Waves, Great Keppel Island, Australia, July 1997, Ed. A.F.P. Houwing, Australian National Univ., Paper No. 2480. Pressure transducers and heat transfer gauges were located at the same stations as the four illustrated skin friction gauges 25, but additional pressure transducers and heat transfer gauges (not shown) were also provided at other stations.

Tests were conducted with both air and nitrogen being introduced at hypersonic speeds to the duct 11 so as to form the mainstream A. Records of pressure and heat transfer with both air and with nitrogen as the test gas were obtained with pressure transducers and heat transfer gauges located at the same stations as the four skin friction gauges 25 and at further stations. Both the pressure and heat transfer rate increased when air was used with the same mass flow of hydrogen, the increase being greatest for the downstream stations. These effects are consistent with the occurrence of combustion in the boundary layer 23. Distributions of pressure along the duct 11 during the test time revealed (as well as the substantial non-uniformities in the duct flow immediately downstream of the step 15 (where the hydrogen is injected) a pressure rise along the duct which increased as the hydrogen mass flow increased, thus providing further evidence of combustion.

The fluctuations in heat transfer with air as the test gas were also somewhat greater than with nitrogen test gas. However, heat transfer records using air test gas but without hydrogen injection showed the same level of fluctuations as with nitrogen test gas, thus indicating that the observed fluctuations with air test gas and hydrogen injection are due to combustion.

It was observed that the combustion induced increase in heat transfer was not reflected in a corresponding increase in the Stanton number. Similar results were obtained under all test conditions indicating that, although combustion takes place in the boundary layer, its effect on heat transfer appears to be taking place mainly through changes induced in the mainstream A.

Readings of the skin friction occurring at the skin friction gauges 25 (both with hydrogen injection and without injection) indicated an initially strongly negative shear, thought to be associated with boundary layer separation, during the initial flow commencement process. However this transitory situation was followed by a period of approximately steady shear. In the case where there was no hydrogen fuel being injected (and also for the first skin friction gauge immediately downstream of the injection nozzle 20 when there was hydrogen injection), steady shear was maintained for the run duration. The comparison of the skin friction readings indicated that the skin friction co-efficient at the duct face 13 was considerably reduced by the injection of hydrogen fuel.

Numerical simulations of the flow in the duct 11 and particularly in the boundary layer 23 were conducted using an appropriate mathematical algorithm. The algorithm predicted pressure distributions along the duct which approximated the experimentally found pressure increases, thus suggesting that the numerical simulations were reasonably representative of the experiments. Curves showing the predicted reduction in local skin friction obtained in the numerical simulations are presented in FIG. 3. In the graphs included in FIG. 3, the vertical axis indicates the measure:

$$1 - \frac{C_f}{C_{fn}}$$

where $C_f$ is the local skin friction co-efficient
and $C_{fn}$ is the local skin friction co-efficient when hydrogen was not being injected but other conditions were the same.

The first graph shows in solid and broken lines respectively the predictions of the numerical simulations with hydrogen injection and combustion and without hydrogen injection and combustion. The experimental readings are shown by the circled points with error bars. The first graph relates to the first injection parameters from Table 1 (i.e. 0.029 kg/s mass flow) and the second graph relates to the mass flow of 0.043 kg/s.

The numerical simulations yielded a value of the skin friction co-efficient without hydrogen injection and averaged over the duct length of $2.45 \times 10^{-3}$, which compares with the measured value of $1.66 \times 10^{-3}$. Results for skin friction are often presented in terms of the mass flow of injectant divided by the no injection skin friction co-efficient and this approach was adopted here, with the results of the simulation presented for a hydrogen mass flow 1.48 times the value used in the corresponding experiments. The levels of skin friction co-efficient were decreased by less than 10% by introducing this factor. The simulations indicate that, while the curves both with and without combustion show a reduction in skin friction as the hydrogen mass flow increases, the reduction in skin friction at 1 metre downstream from injection is approximately doubled by combustion at both injection mass flows, leading to a local skin friction co-efficient which is approximately half the no injection value.

Figure 3:
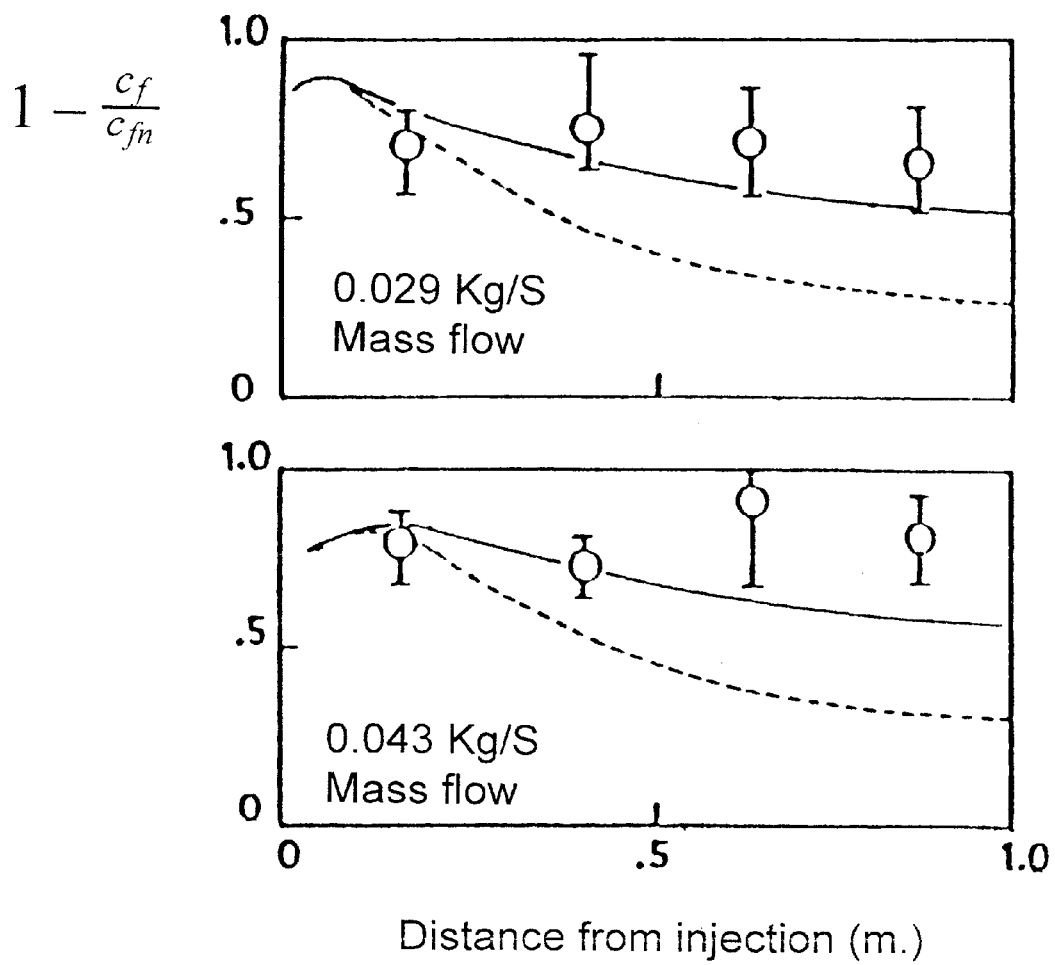

The measurement of skin friction co-efficient reduction for the injected hydrogen parameters of Table 1 and illustrated graphically in FIG. 3 surprisingly indicate a reduction in friction which greatly exceeds the values obtained in the numerical simulation. This may be due to an increase in the level of hydrogen-air mixing and combustion caused by pressure disturbances downstream of the step 15. However it is clear that there is substantial reduction in the skin friction due to combustion. The numerical simulation predicted that fuel injection with combustion would cause a reduction of approximately 50% in the skin friction coefficient. However, the experiments yielded a surprisingly greater effect, with the reduction in skin friction coefficient reaching 70% to 80% of the values without fuel injection.

Although speculative, if pressure disturbances downstream of the step and not predicted by the numerical simulation are increasing the levels of combustion and improving the predicted skin friction reduction, it may be possible to augment the effect by deliberate manipulation of the configuration at the injection zone and of the operating parameters. For example the shapes and configurations of the step 15, the injection nozzle 20, and possibly the duct surface 13 immediately downstream of the step 15 may be modified to create further pressure disturbances or augment turbulence and hence the level of hydrogen-air mixing and combustion. Oxidant may also be introduced into the fuel at or upstream of the injection zone, but under conditions which avoid combustion until after injection. Oxidant could be introduced into the fuel downstream of the injection zone, e.g. by external injections.

The experiments carried out also indicate that the injection of hydrogen fuel is preferably carried out at supersonic speeds and preferably substantially above Mach 1, e.g. at about Mach 1.5 or greater. At Mach numbers approaching 1 and it is believed at injection flow rates at subsonic speeds, the pressure gradients immediately downstream of the step 15 and injection nozzle 20 can cause separation of the boundary layer flow and a resulting increase in skin friction.

In the experimental apparatus, the length of the duct 11 was about 1 metre. A numerical simulation procedure was used to see if the skin friction drag reduction continued further downstream. This numerical simulation indicated that there would be very substantial reductions in skin friction caused by boundary layer combustion persisting over a length of five metres.

Subsequent to the experiments involving skin friction measurements described above, another series of experiments was carried out using a scramjet combustor in a shock tunnel with annular fuel injection and a force balance configuration to measure the net force on the combustion chamber. These experiments confirmed that there is a substantial reduction in skin friction drag within the combustion chamber achieved by fuel injection to provide combustion in the boundary layer.

Figure 4:
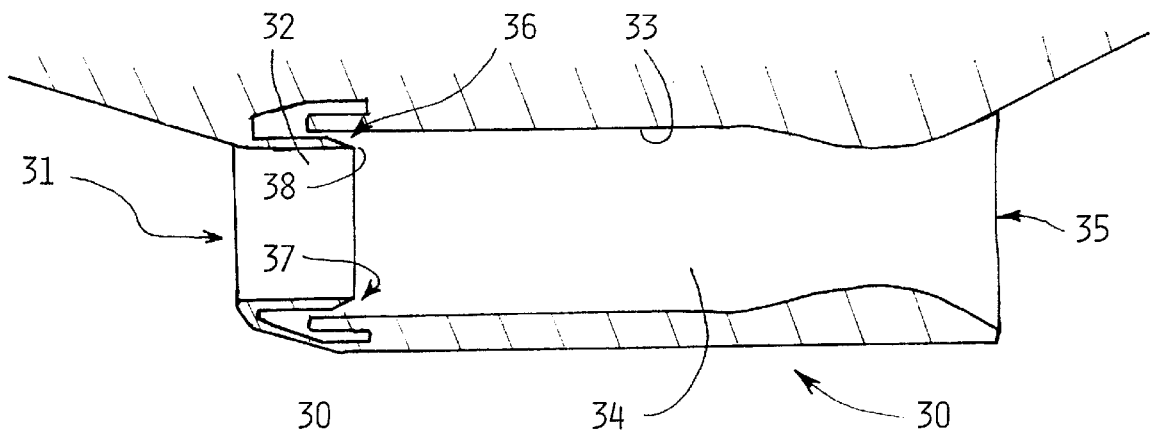
FIG. 4 is a schematic sectional view of a scramjet engine according to the present invention mounted beneath the body of a hypersonic aircraft.

Referring to FIG. 4, the schematically illustrated scramjet engine 30 has an intake 31 for air, a passage 32 through which the air flows at high speed, the passage 32 having a surrounding wall 33 defining the outside surfaces of the passage, a combustion chamber 34, and an exhaust 35 for discharge of air and combustion products. The upper surfaces of the wall 33 can effectively be a continuation of the undersurfaces of the aircraft or vehicle beneath which the engine 30 is mounted. There is means 36 for introducing a fuel into the boundary layer of the air passing along the wall 33 at high speed, the fuel being injected around substantially the entire internal circumference of the wall 33 of the scramjet engine. The conditions of the fuel introduction ensure that the introduced fuel undergoes combustion in the boundary layer while passing along the wall 33 downstream of the introduction thereof.

The means 36 for introducing the fuel is located to inject the fuel upstream of the commencement of the combustion chamber 34. The means 36 illustrated for introducing the fuel comprises a substantially continuous annular slot 37 provided around the entire internal circumference of the wall 33. The annular slot 37 is located in a step 38 facing downstream relative to the passing air so that the fuel is injected in a direction along the wall 33 to ensure the fuel remains in the boundary layer downstream of the step 38 and combustion occurs in the boundary layer downstream of the step. If desired a further fuel introduction along the wall can occur downstream of the combustion chamber.

The mass flow of hydrogen required for the reductions in skin friction are not believed excessive. In fact, a substantial propulsive effect can be generated by the mass flow. For example, using the numerical simulation, it was estimated the specific impulse associated with the skin friction reduction compared to a model not using hydrogen fuel injection was substantial. Also, combustion in the boundary layer increases its displacement thickness and, if the surface is deflected by this amount in order to maintain constant pressure, the pressure acting on the surface would significantly add to the specific impulse. Furthermore, there is a specific impulse contribution arising from the injection velocity of the hydrogen. When combined with regenerative cooling, injection of hydrogen fuel along the relevant surfaces of the article so that the fuel undergoes combustion promises a very attractive technique for use in hypersonic flight.

The effects of such factors as mainstream Mach number and enthalpy, injectant Mach number and temperature, and pressure and geometric scaling are still to be investigated. Nevertheless, the effect of boundary layer combustion on skin friction appears to offer a means of significantly improving the flight performance of slender hypervelocity vehicles.

It will be seen that the method of the present invention and the apparatus which including means for carrying out the steps of the method according to the present invention as described herein can provide substantial reductions in drag, e.g. in vehicles travelling at high speeds, particularly hypersonic speeds but it is believed also at near hypersonic and at supersonic speeds, through the atmosphere. The promise of the invention at this stage of development appears to be great when applied to scramjet engines in which fuel would be injected internally in the direction of air flow to reduce the skin friction drag within the engine, particularly upstream of and within the combustion chamber around the outside walls of that chamber.

What is claimed is:

1. A method of reducing the skin friction drag acting on a surface of an article travelling at high speed relative to a passing fluid wherein the passing fluid forms a boundary layer along the article surface, the method including the steps of:
   a) introducing a fuel by injection into the boundary layer of the fluid relatively passing along the surface of the article at high speed; and
   b) providing conditions of the fuel introduction to ensure that the introduced fuel undergoes combustion in the boundary layer while relatively passing the surface of the article downstream of the introduction of the fuel by providing for the fuel to enter the passing fluid of the boundary layer whereby a major component of the direction of the fuel within the boundary layer is substantially parallel to the local flow direction of the passing fluid downstream of the introduction of the fuel to the boundary layer.

2. A method as claimed in claim 1 wherein the step of introducing the fuel into the boundary layer is carried out in a manner to ensure that most of the fuel remains in the boundary layer and to ensure that combustion of the fuel occurs in the boundary layer.

3. A method as claimed in claim 2 wherein the fuel is introduced into the boundary layer by injecting the fuel substantially parallel to the direction of flow of the fluid relatively passing the article.

4. A method as claimed in claim 3 wherein the fuel is injected through at least one orifice provided at the surface of the article past which the fluid relatively passes, said at least one orifice being arranged so that the fuel enters the relatively passing fluid with a major component of the direction of injection being parallel to the local flow direction at said at least one orifice.

5. A method as claimed in claim 4 wherein said at least one orifice is arranged to inject the fuel at high speed.

6. A method as claimed in claim 5 wherein the fuel is injected through said at least one orifice at supersonic speed.

7. A method as claimed in claim 6 wherein the fuel is injected through said at least one orifice at a speed of about Mach 1.5 or higher.

8. A method as claimed in claim 2 wherein the fuel is injected through at least one orifice at the surface of the article past which the fluid relatively passes and at an angle to the local flow direction at said at least one orifice whereby the fuel is compelled by aerodynamic effects to substantially flow within the boundary layer downstream of said at least one orifice.

9. A method as claimed in claim 8 wherein said at least one orifice is arranged to inject the fuel at high speed.

10. A method as claimed in claim 9 wherein the fuel is injected through said at least one orifice at supersonic speed.

11. A method as claimed in claim 10 wherein the fuel is injected through said at least one orifice at a speed of about Mach 1.5 or higher.

12. A method as claimed in claim 2 wherein the fuel is injected through at least one orifice located in a step facing downstream relative to the passing fluid so that the fuel is injected in a desired direction to ensure the fuel remains in the boundary layer downstream of the step and combustion occurs in the boundary layer downstream of the step.

13. A method as claimed in claim 2 wherein the article comprises a scramjet engine and wherein the fuel is injected around substantially the entire internal circumference of the wall of the scramjet engine.

14. A method as claimed in claim 13 wherein the fuel is injected upstream of the commencement of the combustion chamber of the scramjet engine.

15. A method as claimed in claim 13 wherein the scramjet engine is provided with a substantially continuous annular slot provided around the entire internal circumference of the wall of the scramjet engine and, wherein the method comprises introducing the fuel through the annular slot whereby the fuel remains in the boundary layer and combustion occurs in the boundary layer along the wall of the scramjet engine downstream of the annular slot.

16. A method as claimed in claim 2 wherein the fuel is injected under pressure through a porous surface provided on the article so as to be introduced into the relatively passing fluid whereby the fuel travels along the boundary layer and combustion occurs in the boundary layer.

17. A method as claimed in claim 2 wherein the fuel is introduced into the boundary layer of the fluid relatively passing the article by ablation of fuel from the surface of the article along which the fluid is travelling.

18. A method as claimed in claim 1 wherein the step of providing conditions of the fuel introduction to ensure combustion comprises controlling the thermodynamic parameters of a medium involved in the combustion in the boundary layer, the medium being selected from the fuel and the passing fluid, the thermodynamic parameters being selected from the temperature and the pressure of the medium.

19. A method as claimed in claim 1 wherein the step of providing conditions of the fuel introduction to ensure combustion includes the step of introducing a fuel additive to extend the range of temperatures or pressures at which combustion will occur within the boundary layer, including by lowering the ignition temperature of the fuel introduced into the boundary layer or by increasing the exothermic heat yield of the combustion that occurs in the boundary layer.

20. A method as claimed in claim 19 wherein the fuel additive comprises an oxidant.

21. A method as claimed in claim 1 and further including the step of seeding the relatively passing fluid or seeding the fuel introduced into the boundary layer with chemically active free radicals to extend the range of temperatures and pressures at which combustion will occur within the boundary layer.

22. Apparatus for reducing the skin friction drag acting on a surface of an article travelling at high speed relative to a passing fluid wherein the passing fluid forms a boundary layer along the article surface, the apparatus including means for introducing a fuel into the boundary layer of the fluid relatively passing along the surface of the article at high speed and for providing conditions to ensure that the introduced fuel undergoes combustion in the boundary layer and while relatively passing the surface of the article downstream of the introduction of the fuel, the means including a fuel injector adapted to introduce the fuel to the flow of the passing fluid so that the fuel enters the passing fluid with a major component of the direction of the fuel substantially parallel to the local flow direction of the passing fluid downstream of the introduction of the fuel to the boundary layer.

23. Apparatus as claimed in claim 22 wherein the means for introducing the fuel into the boundary layer is operative to ensure that most of the fuel remains in the boundary layer and to ensure that combustion of the fuel occurs in the boundary layer.

24. Apparatus as claimed in claim 23 wherein the means for introducing the fuel into the boundary layer comprises means for injecting the fuel substantially parallel to the direction of flow of the fluid relatively passing the article.

25. Apparatus as claimed in claim 24 wherein means for introducing the fuel into the boundary layer comprises at least one orifice provided at the surface of the article, the passing fluid passing the at least one orifice, the at least one orifice being arranged so that the fuel enters the passing fluid with a major component of the direction of injection being parallel to the local flow direction at said at least one orifice.

26. Apparatus as claimed in claim 25 wherein said at least one orifice is arranged to inject the fuel at high speed.

27. Apparatus as claimed in claim 26 wherein the means for introducing the fuel into the boundary layer comprises means for injecting fuel through said at least one orifice at supersonic speed.

28. Apparatus as claimed in claim 27 wherein said speed is about Mach 1.5 or higher.

29. Apparatus as claimed in claim 23 wherein the means for introducing the fuel into the boundary layer comprises at least one orifice located in a step facing downstream relative to the passing fluid so that the fuel is injected in a desired direction to ensure the fuel remains in the boundary layer downstream of the step and combustion occurs in the boundary layer downstream of the shoulder.

30. A scramjet engine having an intake for air, a passage through which the air flows at high speed, the passage having a surrounding wall defining the outside surfaces of the passage, a combustion chamber, and an exhaust for discharge of air and combustion products, the scramjet including means for introducing a fuel into the boundary layer of the air passing along the wall at high speed, the fuel being injected around substantially the entire internal circumference of the wall of the scramjet engine, the scramjet engine further including means for providing conditions of the fuel introduction to ensure that the introduced fuel undergoes combustion in the boundary layer while passing along the wall downstream of the introduction of the fuel, the means including a fuel injector adapted to introduce the fuel to the flow of the passing fluid so that the fuel enters the passing fluid with a major component of the direction of the fuel substantially parallel to the local flow direction of the passing fluid downstream of the introduction of the fuel to the boundary layer.

31. A scramjet engine as claimed in claim 30 wherein the means for introducing the fuel injects the fuel a significant distance upstream of the commencement of the combustion chamber of the scramjet engine.

32. Apparatus as claimed in claim 30 wherein the means for introducing the fuel comprises a substantially continuous annular slot provided around the entire internal circumference of the wall.

33. A scramjet engine as claimed in claim 32 wherein the annular slot is located in a step facing downstream relative to the passing air so that the fuel is injected in a direction along the wall to ensure the fuel remains in the boundary layer downstream of the step and combustion occurs in the boundary layer downstream of the step.

34. A high speed vehicle for travelling through the atmosphere at supersonic or hypersonic speed, the vehicle having a propulsion system including a scramjet engine as claimed in claim 30.

* * * * *